United States Patent

Bartolini et al.

[11] 4,313,188
[45] Jan. 26, 1982

[54] METHOD OF RECORDING AN ABLATIVE OPTICAL RECORDING MEDIUM

[75] Inventors: Robert A. Bartolini, Trenton; William J. Burke, Princeton Junction; Allen Bloom, East Windsor, all of N.J.

[73] Assignee: RCA Corporation, New York, N.Y.

[21] Appl. No.: 87,449

[22] Filed: Oct. 22, 1979

Related U.S. Application Data

[63] Continuation of Ser. No. 668,504, Mar. 19, 1976, abandoned.

[51] Int. Cl.³ .................. G11B 7/00; G01D 15/34; H04N 5/76
[52] U.S. Cl. .................. 369/109; 369/275; 346/76 L; 346/135.1
[58] Field of Search .................. 346/76 R, 76 L, 108, 346/135, 1, 135.1; 274/41 R, 41 A, 41.6 R, 42 R; 365/120, 124, 126; 427/164–167; 428/432, 913; 179/100.1 G, 100.3 V, 100.3 G, 100.4 C; 358/127, 128.5, 128.6; 369/109, 275

[56] References Cited

U.S. PATENT DOCUMENTS

| | | | |
|---|---|---|---|
| 2,585,128 | 2/1952 | Howe et al. | 427/250 |
| 3,636,526 | 1/1972 | Feinleib | 365/126 |
| 3,665,483 | 5/1972 | Becker et al. | 346/76 L |
| 3,679,818 | 7/1972 | Courtney-Pratt | 346/76 L |
| 3,747,117 | 7/1973 | Fechter | 346/1 |
| 3,911,444 | 10/1975 | Lou et al. | 346/1 |
| 3,959,799 | 5/1976 | Gambino et al. | 346/135 |
| 3,978,247 | 8/1976 | Brandy et al. | 427/43 |
| 4,023,185 | 5/1977 | Bloom et al. | 346/135 |
| 4,024,546 | 5/1977 | Brill et al. | 346/135 |
| 4,097,895 | 6/1978 | Spong | 358/128 |

FOREIGN PATENT DOCUMENTS

50-151151 12/1975 Japan .
51-18558 2/1976 Japan .
1023494 3/1966 United Kingdom .

OTHER PUBLICATIONS

Greenblott, IBM Tech. Disc. Bulletin, vol. 14, No. 8, 1/72, p. 2358.

Primary Examiner—Raymond F. Cardillo, Jr.
Attorney, Agent, or Firm—Birgit E. Morris; Allen Bloom

[57] ABSTRACT

An ablative optical recording medium comprises a substrate coated with a light reflecting coating of passivated aluminum which in turn is coated with a light absorbing ablative layer. During recording, portions of the light absorbing layer are ablated, or vaporized, by a modulated focussed light beam, thereby exposing portions of the reflective layer. Information is recorded in the form of a reflective-antireflective pattern.

6 Claims, 3 Drawing Figures

METHOD OF RECORDING AN ABLATIVE OPTICAL RECORDING MEDIUM

This is a continuation of application Ser. No. 668,504, filed Mar. 19, 1976, now abandoned.

This invention relates to a novel optical recording medium. More particularly, this invention relates to an optical recording medium for ablative recording comprising a reflective layer coated with a light absorbing layer on a substrate.

BACKGROUND OF THE INVENTION

Spong in U.S. Pat. No. 4,097,895 entitled Multilayer Optical Record filed concurrently herewith and incorporated herein by reference, has described an ablative recording system whereby a focussed modulated light beam, such as a laser beam, is directed at an ablative recording medium. The recording medium comprises a light reflecting material coated with a light absorbing material on a substrate. The thickness of the light absorbing layer is chosen so that a maximum of light energy impinging on the organic layer is retained therein and is converted to thermal energy. This thermal energy causes the light absorbing material in the area struck by the light to sublime or ablate, thereby exposing selective portions of the reflecting layer. During readout, the contrast between the light absorbing layer and the reflecting layer is detected.

In a preferred embodiment of this recording system, a substrate which is flat, smooth and is a non-conductor of heat, is coated with a thin layer of a light reflecting material such as aluminum. The aluminum layer is in turn coated with a layer of an organic light absorbing material such as fluorescein.

Aluminum is an excellent light reflecting material for use in the above-described recording medium, since it can be readily applied to many substrates as a thin, non-grainy, highly reflective and adherent film. Further, aluminum can be evaporated at fairly low temperatures in a vacuum chamber. However, aluminum is also readily oxidized in the presence of oxygen to aluminum oxide ($Al_2O_3$) and a thin monolayer, about 3-5 angstroms thick, forms on the surface of aluminum, even in a vacuum chamber, due to the presence of even trace amounts of oxygen. This thin layer of oxide is not necessarily detrimental to an aluminum light reflective material for use herein as a recording medium, since the reflectivity of the surface is still high and the oxidized layer is so thin that it does not noticeably affect the smoothness or optical quality of the surface.

However, it has been noted that the surface of the above light reflecting material changes with time, particularly when coated with a hydrophilic material such as fluorescein. This is caused by further oxidation of the aluminum due to diffusion of oxygen and water vapor from the fluorescein layer. This continued slow oxidation results in a degradation of the optical finish and a change in bonding strength of the light absorbing layer to the aluminum. This is a problem exacerbated after recording, when part of the aluminum is exposed to the atmosphere and part is covered with a light absorbing layer, resulting in different rates of continued oxidation.

Another problem has been that since aluminum itself is readily ablatable by a laser beam, if the power level of the beam is too high during recording, part of the aluminum is ablated along with the organic layer. The pitting in the aluminum degrades the signal to noise ratio obtainable during readout. It would be desirable to passivate the aluminum.

SUMMARY OF THE INVENTION

We have discovered that light reflecting aluminum having a layer of aluminum oxide about 25-30 angstroms thick is completely passivated to further oxidation. An excellent recording medium herein can be made by evaporating a reflecting layer of aluminum onto a smooth, flat substrate in the absence of oxygen in a vacuum chamber and then adding sufficient oxygen to the vacuum chamber to produce an oxidized layer about 25-30 angstroms thick. The resultant oxidized aluminum layer is then coated with a light absorbing layer to complete the recording medium.

DETAILED DESCRIPTION OF THE INVENTION

The light reflecting aluminum material must be flat and smooth. Preferably, a recording medium of the invention is a thin layer of aluminum on a flat, smooth substrate. The aluminum can be anodized to form an oxidized layer on the surface. The oxidized layer should be thick enough to passivate the aluminum layer to further oxidation and to prevent pitting or ablation during recording. If the oxidized layer is too thick however, it may have reduced light reflecting properties and reduced adhesion to the applied light absorbing layer.

In a preferred embodiment, a light reflecting aluminum layer can be applied by evaporation in a vacuum chamber onto a desired substrate. When a layer of aluminum about 250 to about 500 angstroms thick has been deposited, a small amount of oxygen is fed into the vacuum chamber. The oxygen oxidizes the aluminum layer down to a depth of about 25-30 angstroms thick in about 10 minutes. A vacuum is re-established and the desired organic material is evaporated onto the oxidized aluminum layer.

The nature of the substrate when employed, is not critical. The substrate should have an optically smooth, flat surface to which the subsequently applied aluminum layer is adherent. A glass plate or disc is suitable.

The aluminum reflecting layer should reflect the light employed for recording. An aluminum layer from about 250 to 500 angstroms thick is sufficient for this purpose.

The light absorbing layer must be absorbing at the wavelengths used for recording, and in addition should form an amorphous, coherent film that will not reflect light. Further, the light absorbing layer should be readily ablatable, e.g., evaporable, at low temperatures to form a clearly defined, regularly shaped hole. Fluorescein has been employed at a thickness of about 500 angstroms. A layer of 4-phenylazo-1-naphthylamine obtained by evaporating the dyestuff Sudan Black B in a vacuum chamber about 525 angstroms thick also forms an excellent coating. This coating is described in greater detail in U.S. Pat. No. 4,023,185 issued May 10, 1977 of Bloom, Bartolini and Bell entitled "Ablative Optical Recording Medium".

The invention will be further explained by reference to the drawings.

Figure 1:
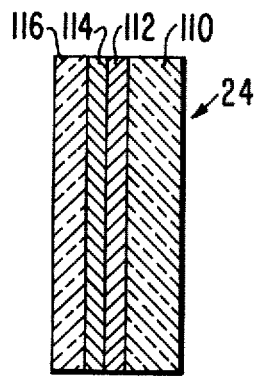
FIG. 1 is a cross-sectional view of an unablated recording medium of the invention.

FIG. 1 shows a recording medium of the invention prior to exposure to a recording light beam comprising a glass substrate 110, a light reflecting layer 112 comprising a layer of aluminum about 300 angstroms thick having a coating 114 about 30 angstroms thick of aluminum oxide and a light absorbing layer 116.

Figure 2:
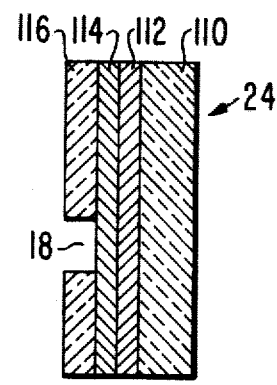
FIG. 2 is a cross-sectional view of an ablated recording medium of the invention.

FIG. 2 shows a recording medium of the invention after exposure to a recording light beam wherein the organic layer 116 has been ablated to leave a hole 118, exposing the reflective layer 114. It will be understood that the recording medium after recording contains a plurality of holes 118 rather than the single one shown in FIG. 2.

Figure 3:
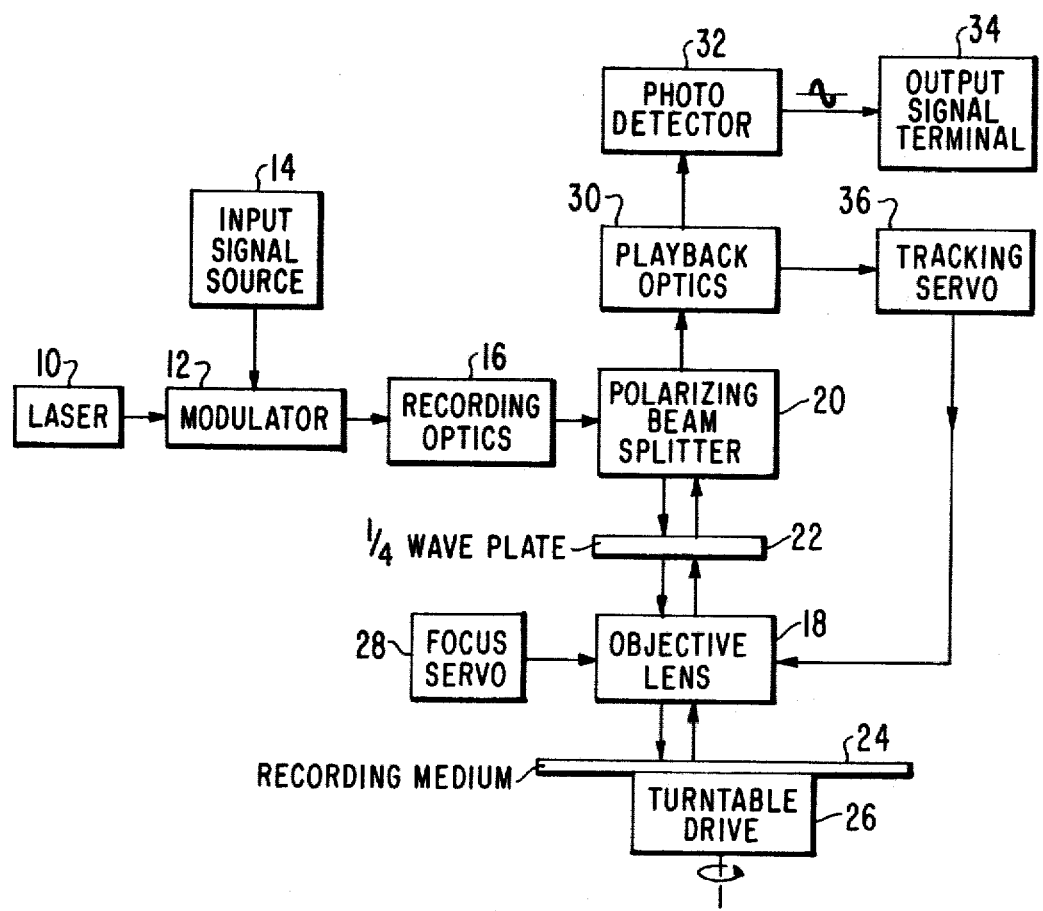
FIG. 3 is a schematic view of a system of recording and playback in which the present recording medium can be employed.

The use of the present recording medium can be explained in greater detail by referring to FIG. 3. For recording, the light emitted by a laser 10 is fed to a modulator 12 which modulates the light in response to an input electrical signal source 14. The modulated light is enlarged by recording optics 16 to increase the diameter of the intensity modulated laser beam so that it will fill the desired aperture of an objective lens 18. The enlarged modulated laser beam is totally reflected by a polarizing beam splitter 20 and passes through a beam-rotating ¼ wave plate 22 to the objective lens 18. The modulated recording beam then impinges upon a recording medium 24 as described in FIG. 1 and ablates, or evaporates, a portion of the light absorbing layer to expose a portion of the reflecting layer. The recording medium 24 is rotated by the turntable drive 26 at about 1800 rpm in a spiral track. A focus servo 28 maintains a constant distance between the objective lens 18 and the surface of the recording medium 24.

For readout, an unmodulated and less intense laser beam, that is one that will not cause ablation in the recording medium, follows the same path as the recording beam to the recording medium 24. The recorded reflection-antireflection pattern modulates the reflected light back through the objective lens 18 and the ¼ wave plate 22. The light, now rotated by 90° in polarization by the two passages through the ¼ wave plate 22, passes through the polarizing beam splitter 20 and is directed by playback optics 30 to a photodetector 32. The photodetector 32 converts the reflected light beam to an electrical output signal terminal 34 which corresponds to the input signal. A tracking servo 36 monitors the light through the playback optics 30 to ensure that the track in the recording medium 24 during playback is the same as that used for recording.

The present recording medium produces high quality recordings with signal to noise ratios of about 50 decibels (dB). Surprisingly, there is no discernible loss in sensitivity for oxidized aluminum versus unoxidized aluminum as a reflecting layer and the recordings are stable and have improved lifetime. Another surprising result is that the oxidized aluminum layer prepared as above does not ablate when excess recording power is employed as does the prior art coating. Thus there is no degradation in obtainable signal to noise ratio due to ablation of the reflective coating.

The invention will be further illustrated by the following examples but the invention is not meant to be limited by the details described therein.

EXAMPLE 1

A glass disc 12 inches (30.5 centimeters) in diameter was rotated in a vacuum chamber above an aluminum target. The chamber was evacuated to $10^{-6}$ torr and a layer of aluminum about 300 angstroms thick was evaporated onto the rotating disc. The heat was shut off and dry oxygen was admitted to the vacuum chamber. After 10 minutes, a layer of aluminum oxide about 30 angstroms thick had formed on the surface of the disc.

The vacuum chamber was again brought to $10^{-6}$ torr and a film of fluorescein about 500 angstroms thick was evaporated onto the aluminum oxide layer.

The resultant recording medium was exposed to 50 nanosecond pulses of light having a wavelength of 4579 angstroms from an argon laser in an apparatus as in FIG. 3. The peak power density of the laser ranged from about $0.35 \times 10^6$ watts/cm$^2$ to $3.1 \times 10^6$ watts/cm$^2$ in sequential exposures. High quality television recordings were made having a signal to noise ratio over 50 dB and there were less than five dropouts, i.e., loss of signal, per image on an average.

The above recording was compared to a recording made from a similar recording medium, except that the aluminum layer was not oxidized and had a layer of aluminum oxide only about 5 angstroms thick. Sensitivity was about the same. However, for power densities of the laser over about $1.8 \times 10^6$ watts/cm$^2$, the aluminum layer was ablated in addition to the fluorescein layer, as noted by pitting in the aluminum surface.

EXAMPLE 2

The procedure of Example 1 was followed, except that the organic layer was formed by evaporating Sudan Black B at 150° C. after oxidizing the aluminum layer. A bright yellow coating of 4-phenylazo-1-naphthylamine about 525 angstroms thick was applied to the oxidized aluminum layer.

After recording at 4880 angstroms wavelength, the signal to noise ratio was over 50 dB with less than five dropouts per image.

The recording was checked periodically over a period of several months. The signal to noise ratio and dropout count remained the same.

The above recording was compared to a recording made from a similar recording medium, except that the aluminum layer was not oxidized. The initial sensitivity was about the same, i.e., a signal to noise ratio of about 50 dB with few dropouts.

However, after a few days, the signal to noise ratio decreased to about 45–50 dB and the dropout count increased to 10–20.

We claim:

1. A method of preparing an information record employing a laser of a given frequency which comprises the steps of:

evaporating a layer of aluminum from about 250 to about 500 angstroms thick onto a substrate under vacuum which is reflective at the laser output frequency, oxidizing said aluminum layer to a depth of from about 25 to 30 angstroms, coating said oxidized aluminum layer with an ablative light absorbing layer which is absorptive at the laser output frequency, and recording an information track comprising a light reflective-light absorptive pattern.

2. A method according to claim 1 wherein said light absorbing layer is applied by evaporation under vacuum.

3. A method according to claim 2 wherein said light absorbing layer is fluorescein.

4. A method according to claim 2 wherein said light absorbing layer is 4-phenylazo-1-naphthylamine.

5. The method according to claim 1 wherein said information track corresponds to video information.

6. The method according to claim 1 wherein said substrate is glass.

* * * * *